Figure 1:
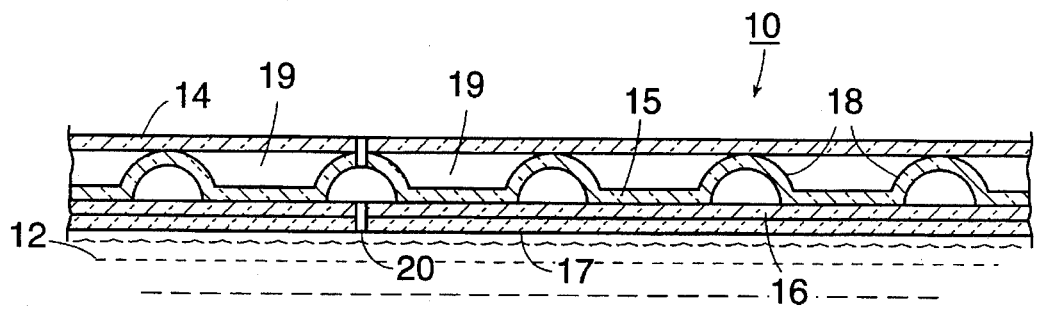

United States Patent [19]

Bussey, Jr. et al.

[11] Patent Number: 5,511,536

[45] Date of Patent: Apr. 30, 1996

[54] SOLAR-TYPE POOL COVER

[75] Inventors: Harry Bussey, Jr., Marco Island, Fla.; Edward J. Ellison, Oakland, N.J.

[73] Assignee: CPI Packaging, Inc., Marlboro, N.J.

[21] Appl. No.: 408,999

[22] Filed: Mar. 23, 1995

[51] Int. Cl.$^6$ ........................................ F24J 2/42
[52] U.S. Cl. ........................ 126/565; 126/566; 126/624
[58] Field of Search ........................ 126/627, 565, 126/624, 566, 564, 561, 568; 4/493, 498, 499

[56] References Cited

U.S. PATENT DOCUMENTS

| | | | |
|---|---|---|---|
| 3,072,920 | 1/1963 | Yellott | 126/566 |
| 3,949,095 | 4/1976 | Pelehach et al. | 126/565 |
| 4,028,750 | 6/1977 | Gustafsson | 4/498 |
| 4,426,995 | 1/1984 | Wilson | 126/566 |

FOREIGN PATENT DOCUMENTS

| | | | |
|---|---|---|---|
| 2717070 | 10/1977 | Germany | 126/566 |
| 168061 | 12/1981 | Japan | 126/565 |
| 2025602 | 1/1980 | United Kingdom | 126/565 |

*Primary Examiner*—James C. Yeung
*Attorney, Agent, or Firm*—McAulay Fisher Nissen Goldberg & Kiel

[57] ABSTRACT

The pool cover is made of multi-layer light weight construction having transparent top layers to permit sunlight to pass through, an opaque layer for absorbing sunlight passing through the transparent layers and a reflective layer to transfer heat from the opaque layer into a pool of water. In addition, a plurality of pockets are formed on one of the transparent layers to encapsulate air therein. In one embodiment, the opaque and reflective layers may be incorporated into a single layer with an opaque surface on one side and reflective surface on the other side. Also, the edges of the cover may be sealed so that the entire cover has an encapsulated air layer. The cover can be reversed to place the reflective layer topmost so as to reflect sunlight from the pool, e.g. for short term pool closure. The opaque layer and reflective layer reduce sunlight penetration and thus inhibit algae growth while the insulating layer reduces heat movement either in or out of the water.

20 Claims, 1 Drawing Sheet

U.S. Patent

Apr. 30, 1996

5,511,536

SOLAR-TYPE POOL COVER

This invention relates to a solar-type pool cover. More particularly, this invention relates to a dual-use solar pool cover.

As is known, various types of pool covers have been employed for covering over swimming pools and the like. In some cases, a tarpaulin-like cover has been employed to cover over a swimming pool when the pool is not in use in order to prevent debris and the like from falling into the water contained within the pool. Typically, these covers are of relative light weight construction. However, in some cases, the covers are of a mesh construction in which case fine-sized debris may enter the pool.

In cases where a swimming pool is heated, use has been made of covers which are constructed to retain as much heat as possible within the body of water within the pool. For example, some pool covers have used a combination of glass and aluminum in an attempt to conserve heat within the pool. However, the use of such materials can be dangerous while being difficult to handle, for example, there is a potential danger of glass breakage while the incompatibility of chlorine with aluminum dictates against the use of such a cover for swimming pool applications.

Other types of pool covers have been of the solar type. For example, U.S. Pat. No. 3,072,920 describes a swimming pool cover for collection or reflection of solar heat in which the cover is made of a sheet of plastic material having a bottom surface covered with a layer of dark-colored material for the absorption of solar energy and an upper surface covered by a reflective surface, such as aluminum. In addition, an over-layer of transparent plastic material is attached to the marginal edge of the plastic sheet to form air-filled compartments or pockets to increase the buoyancy of the cover. In the summer, the cover is to be turned so that the dark absorptive surface is down facing the water with the aluminized surface facing the sky to reflect the sun's radiant energy. In the winter, the cover is to be reversed so that the dark surface is exposed to solar energy.

U.S. Pat. No. 4,146,015 describes a solar pool heater which employs a membrane having a smooth side and a pebbled side wherein each of the "pebbles" is a sealed air pocket. The entire membrane is transparent to permit the transmission of radiant energy to heat the underlying water and pool bottom.

U.S. Pat. No. 4,426,995 describes a solar quilt for heating a swimming pool. The quilt is described as having an upper film formed of semi-hemispherical modules which abut and are sealed to a lower film. The upper film is described as transmissive of downwardly directed solar radiation and reflective of upwardly directed radiant energy in the ultraviolet range. The lower film is said to be absorptive of incident solar energy.

U.S. Pat. No. 4,709,688 describes an opened cell sheeting for use as a covering for swimming pool surfaces. In addition, reference is made to previously known sealed cell pool covers which includes an upper plastic sheet with dimples and a plastic sheet bonded to the upper sheet.

U.S. Pat. No. 3,022,781 describes a heater made of plastic film layers wherein a lower layer is made absorbent to radiant energy by being painted black or by incorporating a black pigment within the plastic composition.

U.S. Pat. No. 3,893,443 describes a floating pool heater employing individual unit heaters which are capable of floating. In addition, each unit has a bottom wall with a blackened surface in the inside.

Generally, the previously known structures are of relatively thick, heavy weight construction. Further, in some cases, the covers which have been made of lightweight materials have tended to be of a transparent nature such that heat energy in a covered pool is permitted to radiate out of the pool through the cover during dark periods. Also, where the covers have been transparent, a portion of the heat band is reflected without being converted to heat in the pool water. In addition, algae growth is promoted in and on the pool surfaces due to the passage of light into the water below the cover.

Accordingly, it is an object of the invention to provide a pool cover which has good insulating qualities with enhanced heat transfer into a body of water in a pool.

It is another object of the invention to provide a pool cover which is of light weight construction and which can be easily handled.

It is another object of the invention to provide a pool cover which can be turned over in order to reflect heat and light from a pool.

It is another object of the invention to provide a pool cover which can be made of recycled plastic materials.

It is another object of the invention to provide a pool cover which eliminates algae growth while the cover is on a swimming pool.

It is another object of the invention to reduce the need for chemicals in maintaining a swimming pool.

It is another object of the invention to provide a dual-use pool cover of low cost construction.

It is another object of the invention or reduce pump and filter run time thereby reducing electricity usage.

Briefly, the invention provides a solar-type pool cover which, in one embodiment, is made of four layer construction comprised of a first transparent or translucent layer for passing sunlight therethrough, a second opaque layer for absorbing sunlight passing through the first layer and a third transparent or translucent layer sandwiched between the first and second layers and having means, such as a plurality of pockets facing one of the other layers and which are sealed relative to the other layer to encapsulate air therein and, thus, act as an insulation barrier. The construction is such that sunlight passing through the transparent or translucent layers heats the opaque layer and the air in the pockets. Typically, the opaque layer is black in color or of a dark heat absorbing color to convert the light passing through the transparent layers to heat.

The solar-type pool cover also has a fourth reflective layer which is secured to the opaque layer in order to face a pool of water and be in full contact with the opaque layer and the water. This layer serves to transfer heat from the opaque layer to the pool of water and to reflect heat from the pool of water back into the pool of water.

The pool cover is constructed so that the transparent layers allow the heat rays of the sun to pass through to the opaque layer which converts the heat rays to heat. At the same time, the air which is encapsulated within the pockets becomes heated and forms an insulation barrier. The opaque layer also conducts the heat to the reflective layer when, in turn, transfers the heat to the pool of water. This reflective layer is of flat construction so as to be in contact with close to one hundred percent of the pool water.

In another embodiment, the pool cover is made of three layer construction wherein the opaque layer and reflective layer are combined into a single layer through a suitable manufacturing process. In this embodiment, the third layer is manufactured to be opaque on one side and reflective on the other side.

In either embodiment, the peripheral edges of the pool cover may be sealed so that air may also be trapped within the spaces defined externally of the air pockets of the insulation barrier layer. In this case, the air which is trapped in these additional pockets is also heated during daylight hours and forms an additional insulation barrier.

When the pool cover is in place during sunlight hours, heat from the sun is transferred into the pool of water to maintain the pool in a heated condition. During the nighttime and/or cool weather, the pool cover provides an insulation blanket which is highly efficient due, in part, to the heated encapsulated air layer and, in part, to the reflective layer which reduces radiational cooling. That is to say, heat which is in the pool of water is reflected by the reflective layer back into the pool of water during darkened conditions. In addition, the heated air in the pockets of the pool cover provide further insulation against heat lost by conduction.

In one embodiment, the pool cover has four layers. In this case, the topmost layer is transparent or translucent for passing sunlight while the second topmost layer is transparent or translucent with the plurality of pockets formed therein to contain sealed air and to trap air. The third layer is opaque while the fourth layer is reflective. Of note, the term "transparent" as used herein means, transparent, translucent or any other type of material which allows sunlight to pass through to heat the opaque layer.

The reflective layer may be made of a plastic which is sufficiently flexible to permit rolling up or folding of the pool cover. For example, the reflective layer and the other layers of the pool cover may be made of polyvinylchloride, polyethylene, polystyrene or polypropylene with the reflective layer having a silver coating thereon.

One particular benefit of the pool cover is that the opaque layer and the reflective layer inhibit light penetration. This greatly reduces algae growth. At the same time, there is a reduction in the need to use chemicals. This not only reduces the chemical costs but also reduces the use of any toxic chemicals and any resultant impact of the environment. This also reduces the time needed to run a pump for circulating the chemicals thereby reduce electricity costs.

The cover is capable of a dual use. In this respect, the cover may be turned over so that the reflective layer is the topmost layer. In this case, external heat as from solar rays is reflected away from the pool of water by the reflective layer. At the same time, the reflective layer and opaque layer inhibit algae growth as light is prevented from passing into the pool. The positioning of the cover in this way allows for a short term pool closure up to several weeks without daily maintenance.

When the cover is used in the closure mode, i.e. with a reflective layer as a topmost layer, there is a reduction in the water temperature as well as a reduction of algae, water evaporation and the need for chemicals. In addition, there is no need to run a pump. As a result, the cover is very effective for short term closures.

The pool cover may also be provided with drainage holes in a uniform grid pattern in order to allow the top surface, in either mode of the cover, to remain dry. This reduces heat transfer due to the reduction of the evaporation process. Also, by keeping the top surface dry, debris is free to be blown off the cover in the same manner that the debris is deposited on the cover.

The cover may also be constructed in a slightly oversized manner with respect to the pool of water over which the cover is to be placed. In this way, the edges of the pool cover can be placed against and folded upwardly several inches in contact with the sidewalls of the pool so as to inhibit debris from passing into the pool of water and to help in locking the cover in place.

It has been known that a transparent or translucent cover will help promote the growth of algae due to the light which passes through the cover coupled with the rise in pool water temperature. During daylight hours, the opaque and reflective layers of the pool cover blocks the light which is necessary for algae growth.

The construction of the pool cover is such that each layer may be made of a suitable light weight plastic material, such as polyvinyl-chloride, polystyrene, polyethylene or polypropylene. In addition, the overall pool cover is flexible so as to permit rolling up or folding on itself.

Still further, the entire cover may be made of recycled plastic material which is less costly and an aid in the struggle to control pollution. In this regard, the opaque layer may be made black in color although any other dark color may be used.

Figure 2:
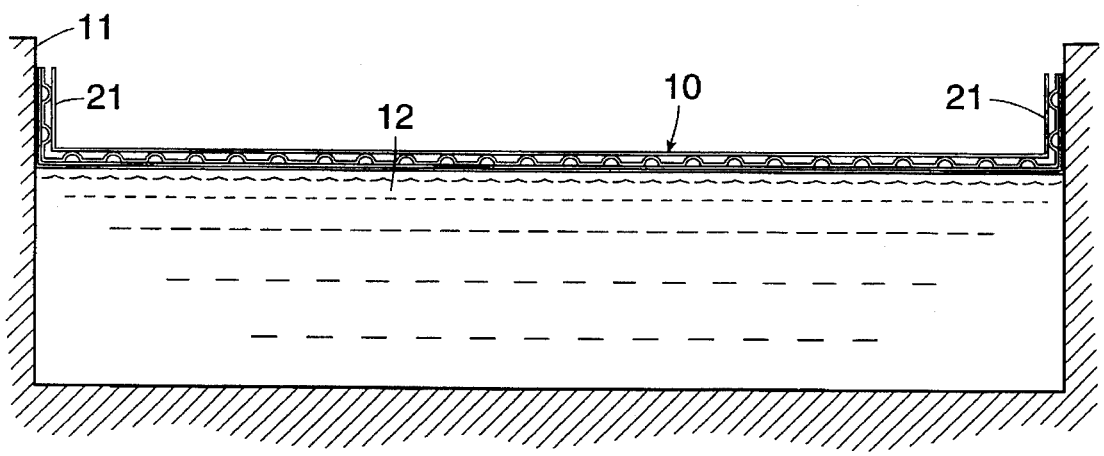
Figure 3:
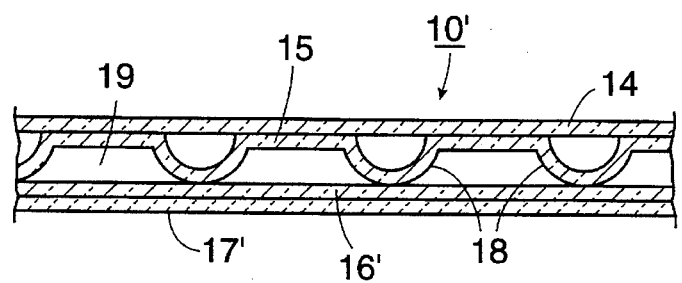

These and other objects and advantages of the invention will become more apparent from the following detailed description taken in conjunction with the accompanying drawings wherein:

FIG. 1 illustrates a cross-sectional view of a solar-type pool cover constructed in accordance with the invention; and FIG. 2 illustrates a pool cover disposed over a pool in accordance with the invention; and FIG. 3 illustrates a cross sectional view of a three layer cover construction in accordance with the invention.

Referring to FIG. 2, the pool cover 10 is of rectangular shape or is shaped to fit the configuration of a pool 11 and is disposed in floating relation on a body of water 12 (see FIG. 2) within the pool 11. A means (not shown) may also be positioned adjacent to the pool 11 for winding of the pool cover 10 thereon when not in use.

Referring to FIG. 1, the pool cover 10 is of flexible construction and is made of four layers 14, 15, 16, 17, for example, of a plastic material, such as polyvinyl-chloride, or other suitable materials.

The top layer 14 is transparent (or translucent) and allows sunlight to pass therethrough. As indicated, the transparent or translucent layer 14 is of planar shape (flat) and is of a thickness of, for example, from 1 to 20 mil.

The second layer 15 is also transparent (or translucent) and is of a thickness of, for example, from 1 to 20 mil. depending on the life expectancy. This second layer 15 has means in the form of a plurality of longitudinally and transversely spaced discrete semi-spherical pockets 18 formed therein in facing relation to the third layer 16 to entrap air. These pockets 18 are sealed relative to the layer 16 so as to encapsulate air therein. Alternatively, the pockets 18 may face and be sealed to the top layer 14 as shown in FIG. 3.

As indicated in FIG. 1, additional air pockets 19 which are interconnected and are formed between the top layer 14 and the second layer 15 and between the pockets 18 to trap air. Alternatively, where the pockets 18 face the top layer 14, the additional air pockets 19 face the opaque layer 16.

The air which is trapped in the pockets 19 may be sealed between the transparent layers 14, 15 by sealing the perimeter of the entire cover 10 thus forming the entire space between the top layer 14 and opaque layer 16 into a sealed air space.

The third layer 16 is flat (i.e. planar) and opaque while being of a similar thickness to the other layers, for example, being from 1 to 20 mil.

The bottom layer 17 is a reflective layer of planar shape. As indicated, the reflective layer 17 is attached to the opaque layer 16 in any suitable manner. The reflective layer 17 may also be of a similar thickness to the other layers, for example, being from 1 to 20 mil.

The overall thickness of the cover 10 is such that the integrated structure may be readily rolled-up or folded and transported from place to place in a relatively easy manner. Likewise, the cover 10 is easily unrolled or unfolded from the stored condition so as to be placed over a pool.

The pool cover 10 may be made in any suitable fashion. For example, a planar sheet of transparent material may be passed over a roller which has recesses therein so that the pockets can be formed by being drawn into the recesses. Alternatively, the sheet of transparent material may be passed over a roller provided with projections of semispherical shape which serve to deform the sheet to form the pockets. Thereafter, a flat sheet for the transparent or translucent layer and flat sheets for the opaque layer and reflective layer can be brought into mutual contact with the formed layer and sealed relative to each other so as to entrap air within the pockets 18. The resulting multi-layered sheet can then be cut into suitable widths or lengths for the formation of the pool cover 10. Air which is trapped in the additional pockets may be sealed thereby by sealing the perimeter of the cut cover, for example by bringing the peripheral edges of the layers together in sealed relation. In this respect, a pool cover 10 may be made of one continuous length and width or may be made of sections which are secured together in a suitable manner (not shown).

The means for winding up of the pool cover 10 may in the form of a take-up roller which is rotatably mounted on suitable supports at opposite ends and a handle for turning of the take-up roller. In addition, a suitable clamping device (not shown) or adhering device (not shown) may be employed on the roller so as to grip one end of the cover 10 so that subsequent turning of the roller causes the remainder of the pool cover 10 to be wound up on the roller.

In the event that the pool is of relatively wide width, use may be made of multiple pool covers in side-by-side relation. In this case, a plurality of means may be employed for winding up the respective covers.

The pool cover may also be of other shapes than rectangular and may be custom-shaped to the shape of a given pool.

Referring to FIG. 3, wherein like reference characters indicate like parts as above, the pool cover 10' may be made of three layers. For example, as above, the cover 10' has a transparent top layer 14 and a transparent pocketed layer 15 secured to the top layer 14. The third layer is provided with an opaque surface 16' on one side and a reflective surface 17' on the opposite side. Such a layer may be formed in any suitable manner.

The three layer pool cover 10' is otherwise constructed and used in the same manner as described above with respect to a four layer construction.

When in use, the pool cover 10 as shown in FIG. 2 is laid over the body of water 12 in the swimming pool 11 during cool periods or during nighttime periods in order to conserve the heat within the body of water 12.

Referring to FIGS. 1 or 3, during daytime, sunlight which impinges on the pool cover 10 passes through the transparent layers 14, 15 to heat the opaque layer 16. Heat is then passed from the opaque layer 16 directly to the reflective layer 17 and, thence, by contact directly to the body of water 12. Typically, the pool 11, as shown in FIG. 2, is provided with recirculation equipment so that the hotter water which is at the top of the pool can be cycled to the bottom of the pool whereby the cooler water at the bottom of the pool is moved to the top to be heated by the cover 10.

At the same time as the opaque layer 16 shown in FIGS. 1 and 3 is being heated by sunlight, the air encapsulated within the pockets 18 and the dead or encapsulated air pockets 19 retards heat from leaving the warm water by passing upwardly through the pool cover 10 while at the same time, the reflective layer 17 reflects heat from the pool water back into the pool. The cover thus acts as a heat check valve. In one position, the cover passes heat through and then contains that heat within the water. In an opposite position, the cover reflects heat away and due to the insulating qualities inhibits heat transfer into the water.

Since the opaque layer 16 and reflective layer 17 serve to block passage of sunlight into the body of water 12, algae growth is inhibited in the water and on the sides and bottom of the pool. This, in turn, leads to a reduction in the need for chemicals in the water to suppress algae growth. Further, since the layer 16 is opaque, there is no need to incorporate an ultraviolet light inhibitor in the plastic material of the layer.

Where the pool is not to be used for several weeks, the cover 10 may be placed over the pool of water in a reversed mode. That is, the cover 10 may be placed over the pool of water with the reflective layer 17 being the topmost layer. When the cover is in this position, heat is reflected away from the pool of water by the reflective surface 17. In addition, heat is retarded from entering the water due to the insulated layer between the reflective layer 17 and the pool water, that is, the sealed air and trapped air pockets between the now bottommost transparent layer 14, intermediate layer 15 and opaque layer 16. At the same time, heat exits from the pool water through the sides and bottom of the pool due to a lack of insulation thereat. This feature coupled with the reflective layer 17 and the opaque layer 16 inhibit algae growth by furnishing a cool dark environment. In addition, the need to replace water is eliminated due to the cover greatly reducing evaporation while no filter run time is required. This eliminates the concern of burning out the pump and possibly starting a fire due to a low water level.

The reflective layer 17 may be made of a plastic material such as a polyvinyl-chloride, polystyrene, polyethylene or polypropylene, which has a reflective powder dispersed therein, for example a silver powder. Alternatively, the reflective layer may be made of a plastic which has a silver coating thereon. In either case, the reflective layer and, more particularly, the cover 10 is sufficiently flexible so as to be rolled up into a cylindrical roll or folded.

It is to be noted that the reflective layer may be made of a reflective plastic material such as Mylar. However, such materials tend to be relatively stiff and rigid and would inhibit rolling up or folding of a pool cover of any extended length.

Referring to FIG. 1, the pool cover 10 may be provided with a plurality of drainage holes 20 which pass through the four layers 14–17 in order to pass water therethrough. Thus, when in use, should rain fall onto the cover, the drainage holes 20 permit the rain to pass through the cover 10 into the pool 11 thereby avoiding any puddle formation on the top of the cover 10. Thus, the top surface of the cover can be quickly dried in sunlight or otherwise thereby permitting debris which falls onto the top surface to be readily blown off the cover. These holes 20 greatly reduce the evaporation process which is a potent source of heat loss from the pool water.

Referring to FIG. 2, the pool cover 10 may be oversized relative to the size of the pool. In this regard, the pool cover 10 may be laid onto pool water surface and folded upwardly at the edges 21 several inches to abut the sidewall of the pool so as to inhibit foreign material from entering into the pool water. The folding up of the edges of the cover and abutment with the pool sidewalls tends to lock the cover 10 in place. This procedure is applicable to either position of the cover 10.

In accordance with the invention, various modifications may be made. For example, the top transparent layer may be omitted so that the layer with the bubbles becomes an exposed top layer. A cover made of this construction is not as effective as the pool covers described above but may be useful as a pool cover. However, in such cases, the bubbles are exposed to the outside environment. Hence, when folding up the pool cover, there is a possibility that the bubble side of the pool cover will be dragged along a concrete apron or the like surrounding a pool. In such cases, a sand papering effect may take place which causes the bubbles to become torn or otherwise damaged so that air leaks out of the bubbles.

In the three-layer construction and four-layer construction described above, the bubble layer is protected by the exterior layers so that a sand papering effect does not occur. As a consequence, the bubble layer can be made thinner than the exterior layers. For example, the bubble layer may have a thickness of 1 mil while the outer layers each have a thickness of 3 mils or greater.

During manufacture of the pool cover, various types of techniques can be employed to place air in the bubbles and to seal the air in place. Alternatively, it is also possible to construct the cover so that the bubbles are interconnected to each other and to place a valve at the periphery of the pool cover in communication with the bubbles. The valve may be constructed so that air can be pumped into the cover after the cover has been purchased by a consumer and unfolded from a collapsed state. Alternatively, the cover can be constructed so that when the cover is unfolded into a position of use, the valve draws outside air into the interconnected bubbles. In this case, the cover relies upon a vacuum in each of the bubbles to draw air in.

The invention provides a pool cover of relatively light weight. For example, the cover may have a weight of from 1 to 10 pounds per hundred square feet.

Further, the invention provides a cover which can be readily manufactured and installed in place.

When the pool cover is not in use, the pool cover may be wound up or folded on itself for storage purposes. In these conditions of non-use, the light-reflective layer should be exposed in order to prevent sunlight from heating and decaying the plastic of the pool cover 10 thus, increasing the life expectancy of the cover.

The invention further provides a pool cover which greatly reduces the need for chlorine and algaecides. Further, the reduced need for pool chemicals reduces the amount of pollutants released into the environment.

Still further, the use of the cover reduces the need for pump run time thereby saving electricity. This also increases the longevity of the pump and pump motor and extends the intervals between filter cleaning.

The use of holes in the pool cover allow rain water to enter into the pool to replace water which has evaporated over a period of time. In addition, the drainage holes inhibit the formation of puddles which provides for a dry surface for wind to remove debris from the top of the cover and reduces the process which removes heat from the pool.

When the cover is used with the clear side up for heat, there is a reduced pump run time whereas when the cover has the reflective layer facing upward, there is no need for any pump run time. In such cases, there is either a reduced electrical usage or elimination of electrical usage.

When used or stored with the reflective layer facing upwardly, the life of the cover is increased since there is a decrease in the decay of the cover per number of hours used.

What is claimed is:

1. A solar-type pool cover comprising a first transparent layer for passing sunlight therethrough;

a second opaque layer for absorbing sunlight passing through said first layer;

a third transparent layer between said first and second layers and having a plurality of pockets therein facing one of said first and second layers and sealed relative thereto to encapsulate air therein whereby sunlight passing through said first layer heats said opaque layer and the air in said pockets; and a fourth reflective layer secured to said opaque layer to face a pool of water and to transfer heat from said opaque layer to the pool of water and to reflect heat from the pool of water back into the pool of water.

2. A pool cover as set forth in claim 1 which further comprises a plurality of drainage holes in said layers for passing water therethrough.

3. A pool cover as set forth in claim 1 wherein said layers are sealed together at the peripheral edges thereof to seal air therein and between said pockets.

4. A pool cover as set forth in claim 1 wherein said reflective layer has a silver coating thereon.

5. A pool cover as set forth in claim 4 wherein said reflective layer is made of plastic.

6. A pool cover as set forth in claim 4 wherein each layer is made of plastic and is sufficiently flexible to permit rolling up of the pool cover.

7. A pool cover as set forth in claim 4 wherein each layer is made of a material selected from the group consisting of polyvinyl-chloride, polystyrene, polyethylene and polypropylene.

8. A solar-type pool cover comprising a first transparent layer for passing sunlight therethrough;

a second transparent layer secured to said first layer and defining a plurality of pockets to contain air therein; and a third layer secured to said second layer to seal air within said pockets, said third layer having an opaque surface on one side facing said second layer to heat the air in said pockets in response to sunlight impinging on said opaque surface through said first and second layer and a reflective surface on an opposite side to face a pool of water and to transfer heat from said third layer to the pool of water and to reflect heat from the pool of water back into the pool of water.

9. A pool cover as set forth in claim 8 which further comprises a plurality of drainage holes in said layers for passing water therethrough.

10. A pool cover as set forth in claim 8 wherein said reflective surface is a silver coating.

11. A pool cover as set forth in claim 8 wherein each layer is made of plastic and is sufficiently flexible to permit rolling up of the pool cover.

12. A pool cover as set forth in claim 8 wherein each layer is made of a material selected from the group consisting of polyvinyl-chloride, polystyrene, polyethylene and polypropylene.

13. A pool cover as set forth in claim 8 wherein said third layer is flat.

14. A pool cover as set forth in claim 8 wherein said pockets face said third layer and are sealed relative to said third layer.

15. A pool cover as set forth in claim 8 wherein said second layer is of a thinner thickness than each of said first and third layers.

16. A pool cover as set forth in claim 15 wherein said second layer has a thickness of 1 mil and said first and third layers each have a thickness of at least 3 mils.

17. A pool cover comprising a first transparent layer for passing sunlight therethrough;

a second opaque layer secured to said first layer for absorbing sunlight passing through said first layer;

a plurality of longitudinally and transversely spaced discrete pockets in said first layer facing said opaque layer and sealed relative to said opaque layer to encapsulate air therein whereby sunlight passing through said first layer heats said opaque layer and the air in said pockets to form an insulating barrier over a pool surface; and a third reflective layer secured to said opaque layer to face a pool of water and to transfer heat from said opaque layer to the pool of water.

18. A pool cover as set forth in claim 17 wherein said pockets are of semi-spherical shape.

19. A pool cover as set forth in claim 17 wherein said pockets are interconnected to each other to permit filling of said pockets with air from an external source.

20. A pool cover as set forth in claim 17 wherein said third layer comprises a reflective coating on said second layer.

* * * * *